(12) United States Patent
Hanson et al.

(10) Patent No.: US 9,218,847 B2
(45) Date of Patent: *Dec. 22, 2015

(54) SYSTEM AND METHOD FOR TESTING DATA STORAGE SYSTEMS UTILIZING MICRO-TRANSITIONS

(71) Applicant: HGST Netherlands B.V., Amsterdam (NL)

(72) Inventors: Weldon Mark Hanson, Rochester, MN (US); Michael Paul Salo, San Jose, CA (US); Alexander Taratorin, Sunnyvale, CA (US); Roger William Wood, Gilroy, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 111 days.

This patent is subject to a terminal disclaimer.

(21) Appl. No.: 14/132,966

(22) Filed: Dec. 18, 2013

(65) Prior Publication Data

US 2015/0170707 A1      Jun. 18, 2015

(51) Int. Cl.
*G11B 20/18* (2006.01)
*G11B 20/10* (2006.01)

(52) U.S. Cl.
CPC ........ *G11B 20/182* (2013.01); *G11B 20/10398* (2013.01)

(58) Field of Classification Search
CPC ................... G11B 20/10305; G11B 20/10398; G11B 20/10407
See application file for complete search history.

(56) References Cited

U.S. PATENT DOCUMENTS

| | | | |
|---|---|---|---|
| 4,306,201 A * | 12/1981 | Nakamura | 330/294 |
| 5,854,554 A | 12/1998 | Tomita et al. | |
| 6,246,729 B1 | 6/2001 | Richardson | |
| 7,123,428 B2 | 10/2006 | Yeo et al. | |
| 7,359,303 B2 | 4/2008 | Mohan et al. | |
| 7,525,307 B2 | 4/2009 | Shen | |
| 7,892,663 B2 | 2/2011 | Nakagawa et al. | |
| 7,929,255 B2 | 4/2011 | Umezaki et al. | |
| 7,932,717 B2 | 4/2011 | Beach et al. | |
| 7,948,708 B2 | 5/2011 | Messner et al. | |
| 8,885,275 B1 * | 11/2014 | Lou et al. | 360/31 |
| 2009/0147389 A1 | 6/2009 | Taratorin et al. | |
| 2012/0200956 A1 * | 8/2012 | Ishibashi et al. | 360/86 |
| 2012/0268112 A1 | 10/2012 | Granger-Brown et al. | |

FOREIGN PATENT DOCUMENTS

WO    WO 2004/039089 A2    5/2004

OTHER PUBLICATIONS

Chang, T.Y., "Dynamic head characterization in the presence of reader nonlinear distortion," IEEE Transactions on Magnetics (Jul. 2004) 40 (4): 1963-1968. Abstract only.

(Continued)

*Primary Examiner* — Daniell L Negron
(74) *Attorney, Agent, or Firm* — Billion & Armitage; Michael A. Collins

(57) ABSTRACT

A method of testing a one or more components of a data storage system introduces a first plurality of micro-transitions into a first data write pattern, which is then written to a magnetic media. A read-back signal is generated, and a frequency response of the read-back signal is analyzed to determine performance of the one or more components of the data storage system.

29 Claims, 15 Drawing Sheets

(56) References Cited

OTHER PUBLICATIONS

Dodrill et al., "Magnetic in-line metrology for GMR spin-valve sensors," Lake Shore Cryotronics, Inc. (Feb. 3, 2012): 1-11. <http://www.lakeshore.com/Documents/DataTech%2OGMR.pdf>.

IBM, "A dynamic kink test to measure sensor instability in GMR head," IBM Technical Disclosure Bulletin (Nov. 7, 2002) < http://ip.com/IPCOM/000016283> Abstract only.

Wilson et al., "Generalized method for measuring read-back nonlinearity using a spin stand," J. Appl. Phys. (1997) 81 (8): 4828-4830.

Wong, Pak-Kin, "Reliability of tunneling magnetoresistance recording head-lifetime, failure mode, and production screening," IEEE Transactions on Magnetics (Feb. 2006) 42 (2): 232-236. Abstract only.

* cited by examiner

SYSTEM AND METHOD FOR TESTING DATA STORAGE SYSTEMS UTILIZING MICRO-TRANSITIONS

CROSS-REFERENCE TO RELATED APPLICATIONS

Reference is made to application Ser. No. 14/133,075 entitled "System and Method for ATI/FTI Detection in Magnetic Media" which is filed on even date and is assigned to the same assignee as this application.

TECHNICAL FIELD

This disclosure relates to data storage systems and in particular to testing of data storage systems.

BACKGROUND

Data storage systems can be incorporated into a wide range of devices, including laptop or desktop computers, tablet computers, digital video recorders, set-top boxes, digital recording devices, digital media players, video gaming devices, video game consoles, cellular telephones, and the like. Magnetic data storage systems include one or more magnetic disks, each comprised of magnetization areas that can be oriented in one of two directions. A magnetic transducer is used to read data from a disk and write data to the disk. Different magnetic recording techniques may be used to store data to the disk. Magnetic recording techniques include, for example, longitudinal magnetic recording (LMR), perpendicular magnetic recording (PMR), and shingled magnetic recording (SMR). Heat assisted magnetic recording (HAMR) may be used with LMR, PMR, or SMR.

Performance of the magnetic transducers (which includes a write head and a read head) varies according to a number of factors. In some cases, the variations result in the part being scrapped, while in other cases the variations can be corrected by modifying circuit parameters of the data storage device. In either case, testing of the magnetic transducers is an important aspect of data storage system performance.

With respect to read head testing, a number of standard measurements are commonly employed to determine the quality of the particular read head being tested. For example, a T50 parameter and a resolution parameter are commonly measured in order to assess read head performance. However, read head nonlinearities and saturation of the read head will distort these parameters. To compensate for read-head nonlinearity, complicated quasistatic transfer curve testing is used, which requires digitizing read-back waveforms and performing complex data processing. The amount of time required performing the test and processing data increases the cost associated with production testing of read heads. It would therefore be beneficial to develop a system and/or method of testing read heads that could be performed quickly.

Read head testing may be performed on a spin stand prior to installation of the read head into a particular data storage device (e.g., hard disk drive). However, in addition to read head testing, similar tests are required once the read head has been installed in a particular application (e.g., hard disk drive) in order to properly space the read head above the magnetic media, which becomes an exercise in determining saturation associated with a read-back signal. This type of testing, although in a different environment, introduces the same type of problems as those experienced in spin stand testing of a read head. It would therefore also be beneficial to develop a system and/or method of testing read head spacing in installed applications that could be performed quickly.

SUMMARY

A method of testing a one or more components of a data storage system includes introducing a first plurality of micro-transitions into a first data write pattern and writing the first data pattern with introduced micro-transitions to a magnetic media. A read-back signal is generated based on the first data pattern written to the magnetic media. Performance of the one or more components of the data storage system is determined based on analysis of a frequency response of the first read-back signal, including analysis of the frequency response to the introduced micro-transitions.

A system for testing data storage systems includes a micro-transition generator, a write head, a read head, and a spectrum analyzer. The micro-transition generator introduces a first plurality of micro-transitions into a first data write signal. The write head writes the first data write signal, including introduced micro-transitions, to a magnetic media. The read head generates a first read-back signal in response to the first data write signal written to the magnetic media. The spectrum analyzer converts the first read-back signal to a frequency domain, and analyzes a frequency response of the read-back signal to determine performance of the one or more components of the data storage system

BRIEF DESCRIPTION OF THE DRAWINGS

FIG. 16A is a chart illustrating the lack of correlation between jitter and error rates when sensor distortions and noise are unaccounted for.

FIG. 16B is a chart illustrating the correlation between jitter and error rates attainable when nonlinearities are accounted for.

DETAILED DESCRIPTION

The present invention provides a system and method of testing magnetic data storage devices. In particular, the present invention introduces timing disturbances into a data pattern written to the magnetic media. The timing disturbances (referred to as micro-transitions) introduce a spectral component into the read-back signal that is substantially independent of read head nonlinearities. As a result, the frequency response of the read-back signal, which includes the frequency response to the spectral component introduced by the micro-transitions, provides information regarding resolution of a magnetic transducer (and in particular, of the read head). In addition, sensor nonlinearities can be measured by introducing timing disturbances into both low-density and high-density data write patterns. The resulting frequency response of the read-back signals (in particular, the amplitude of the harmonics associated with the introduced spectral components) are compared to detect nonlinearities associated with the magnetic transducer, including nonlinearities associated with both the write head and the read. Finally, because the frequency response to introduced micro-transitions and the frequency response of media noise are substantially similar, the micro-transition frequency response can additionally be used to measure media noise (e.g., transition jitter) associated with the media.

Figure 1:
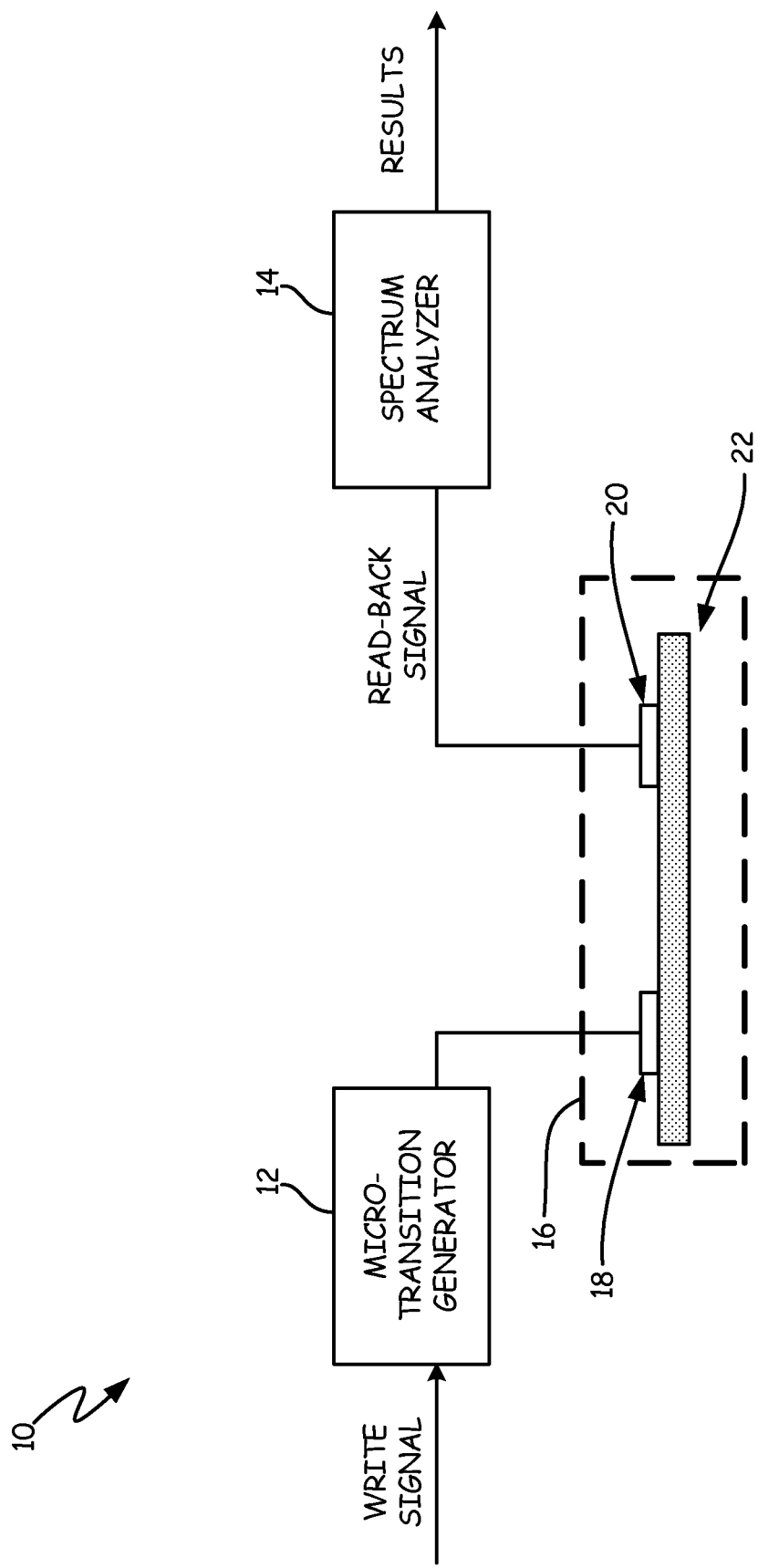
FIG. 1 is a schematic diagram of a magnetic transducer testing system according to an embodiment of the present invention.

FIG. 1 is a schematic diagram of testing system 10 according to an embodiment of the present invention. Testing system 10 includes micro-transition generator 12, spectrum analyzer 14 and data storage system 16, which includes write head 18, read head 20, and magnetic media 22. Although illustrated as geographically distal to one another, write head 18 and read head 20 may be co-located or located near one another. Together, write head 18 and read head 20 may be referred to as magnetic transducer. In one embodiment, data storage system 16 is a spin stand tester capable of testing a plurality of read heads 20 prior to installment of the read heads in a particular application (e.g., hard disk drive (HDD)). In another embodiment, data storage system 16 is a hard disk drive (HDD) or similarly assembled data storage device. In addition, in some embodiments micro-transition generator 12 may utilize circuitry (e.g., precompensation circuitry) included as part of data storage system 16, in which case micro-transition generator 12 would be included as part of data storage system 16.

Testing of the magnetic transducer, including write head 18 and read head 20, involves writing a test signal to magnetic media 22 via write head 18, and then generating a read-back signal via read head 20. The term 'testing' refers both to operations performed to test the performance or capability of components of data storage system 16 (e.g., read head, write head, etc.), as well as operations used to configure operation of data storage system 16 (e.g., alignment of read head 20 spacing from magnetic media 22, etc.).

In the embodiment shown in FIG. 1, the write signal is modified by micro-transition generator 12 before being written to magnetic media 22. In particular, micro-transition generator 12 embeds a plurality of small timing disturbances into the write signal referred to as micro-transitions. These micro-transitions in the write signal add spectral component to the data being written to magnetic media 22. When read head 20 reads the data written to magnetic media 22, the read-back signal will include these spectral components. Analyzing the read-back signal in the frequency domain (i.e., the frequency response of the read-back signal) provides information about the performance of the magnetic transducer. In particular, as described in more detail below, the frequency response to the introduced micro-transitions are free of saturation effects associated with read head 20, and therefore can be used to determine parameters associated with the magnetic transducer, including resolution of read head sensor 20. In addition, the introduction of micro-transitions and subsequent analysis of the frequency response to the introduced micro-transitions can be used to detect nonlinearities introduced by both write head 18 and read head 20, and can further be used to detect media noise (e.g., transition jitter) associated with magnetic media 22.

Spectrum analyzer 14 detects the spectral components associated with the introduced micro-transitions by analyzing and/or converting the read-back signal into the frequency domain. For example, in one embodiment, spectrum analyzer 14 performs a discrete Fourier transform (DFT) of the read-back signal to obtain the frequency response to the read-back signal. In other embodiments, other well-known means of converting a signal from a time domain to a frequency domain may be employed. The frequency response may include both a fundamental frequency associated with the embedded micro-transitions and harmonics thereof, one or more of which may be analyzed to detect parameters of data storage device 16. Analysis of the frequency response by spectrum analyzer 14 may include measuring and storing amplitudes associated with frequency response of the readback signal, and may additional include calculations performed based on the measured and stored values. In other embodiments, spectrum analyzer 14 may be responsible only for conversion of the read-back signal from a time domain to a frequency domain, wherein analysis of the frequency response would be left to downstream computing systems. However, for purposes of this discussion, spectrum analyzer 14 is capable of providing both frequency domain conversion and calculations.

A benefit of the present invention is that the spectral analysis of the read-back signal is computationally simple, and can therefore be performed in near real-time. As a result, analysis may be performed by spectrum analyzer 14 without requiring separate, dedicated computer systems to analyze read-back results. This is contrast with prior art systems, which required complex quasistatic transfer curve testing of read-back signals in order to calculate parameters associated with a data storage device.

The parameters calculated or otherwise determined based on the frequency response to the read-back signal is provided as an output by spectrum analyzer 14 (labeled in FIG. 1 as 'Results'). The 'Results' output may include the parameters themselves, or alerts or warnings indicating that the calculated parameters indicated a problem or error associated with data storage system 16.

Figure 2:
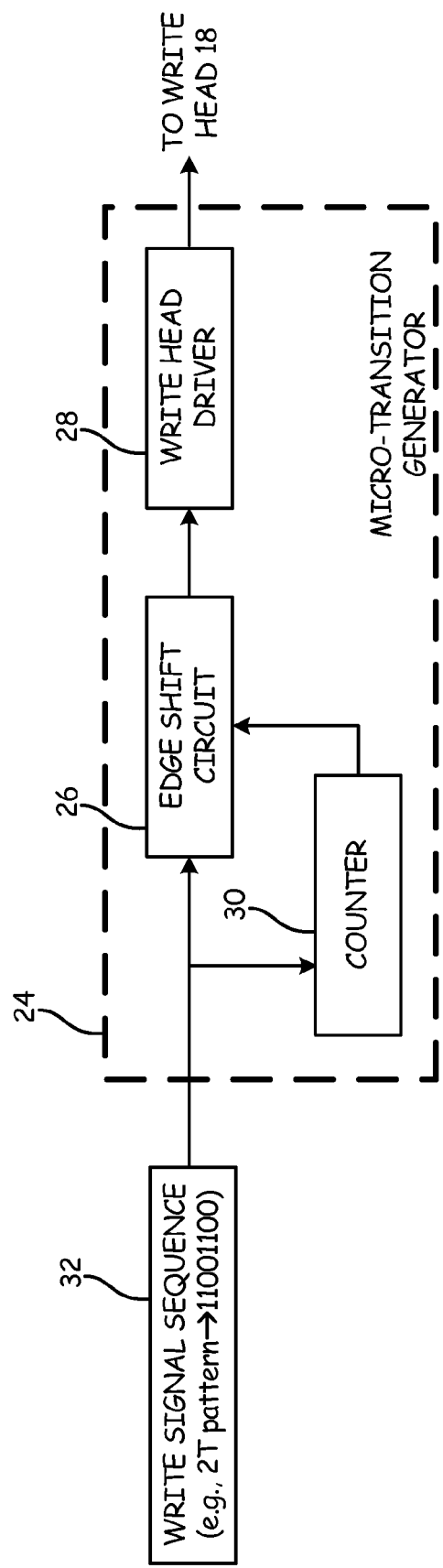
FIG. 2 is a schematic diagram of a micro-transition generator according to an embodiment of the present invention.

FIG. 2 is a schematic diagram of micro-transition generator 24 according to an embodiment of the present invention. Micro-transition generator 24 includes edge-shift circuit 26, write head driver 28, and counter 30. In the embodiment shown in FIG. 2, micro-transition generator 24 operates on a square wave write signal 32 having a 2T pattern (i.e., two positive magnetizations (11), followed by two negative magnetizations (00)), resulting in a square wave with a period of 4T, wherein T denotes the smallest write period possible for a particular data storage device 16. In other embodiments, the period may be modified as desired (e.g., 3T, 8T, 10T, etc.).

In the embodiment shown in FIG. 2, micro-transition generator 24 embeds periodic timing disturbances (i.e., micro-transitions) into square wave write signal 32. Each periodic timing disturbance results in a transition of write signal sequence 32 being advanced (or delayed) by a small amount as shown in more detail with respect to FIGS. 3A-3B. The small, periodic timing shift in the write signal sequence introduces spectral components into the write signal.

In the embodiment shown in FIG. 2, edge shift circuit 26 and counter 30 are responsible for introducing the periodic timing disturbances. In the embodiment shown in FIG. 2, counter 30 monitors write signal sequence 32 and counts transitions associated with the write signal sequence. When a defined count threshold is met (e.g., 8), then counter 30 provides an indication to edge shift circuit 26 to introduce a timing disturbance or micro-transition into the write signal sequence. In other embodiments, counter 30 may not be required to monitor writ signal sequence 32, but rather may increment its counter based on an internal clock.

Edge shift circuit 26 receives write signal sequence 32 and input from counter 30, and acts to advance (or delay) write signal sequence 32 by a determined amount (e.g., 10% of the period of the square wave write signal) at a period determined by counter 30. For example, edge shift circuit 26 and counter 30 may be configured to advance (or delay) write signal sequence 32 at every 8$^{th}$ transition of write signal sequence 32 (e.g., 2T pattern) to provide micro-transitions at regular 16T intervals. Edge shift circuit 26 provides write signal sequence (including introduced micro-transitions) to write head driver 28, which causes the write signal sequence to be written to write head 18.

In one embodiment, edge shift circuit 26 is a pre-compensation circuit. Typically, pre-compensation circuits are employed to advance or delay a write signal based on the frequency of the write signal sequence in order to more precisely locate transitions on the magnetic media to be written. However, because the function of a pre-compensation circuit is to advance and/or delay a write signal sequence by a determined amount, the pre-compensation circuit may in addition be employed in combination with counter 30 to introduce the desired periodic micro-transitions into the write signal sequence.

Figure 3A:
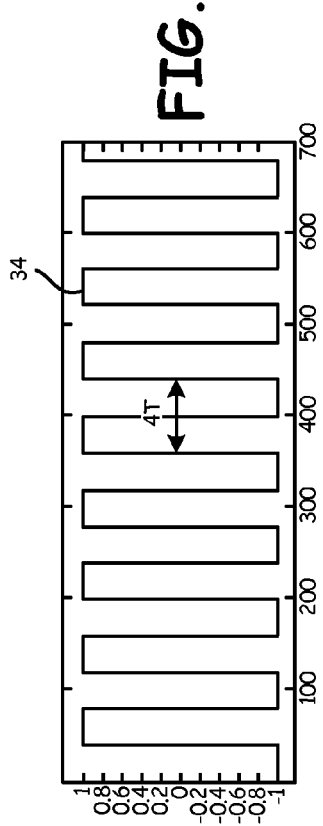
FIGS. 3A-3C are waveform diagrams illustrating the introduction of periodic timing disturbances (i.e., micro-transitions) into a data write pattern according to an embodiment of the present invention.
Figure 3B:
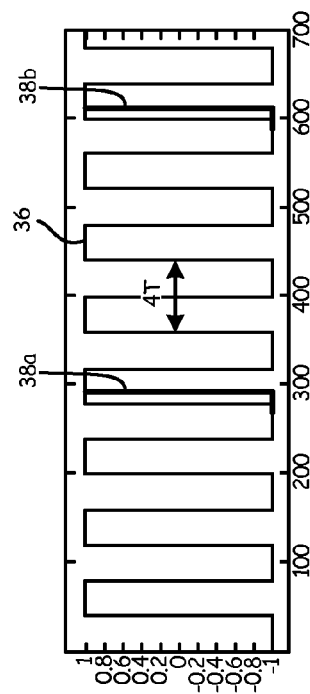
Figure 3C:
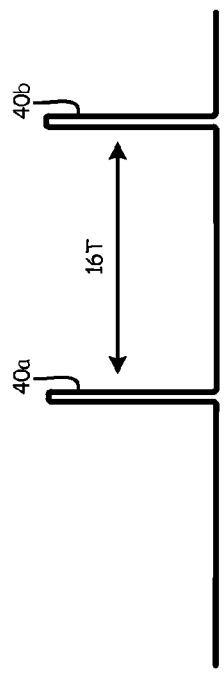

FIGS. 3A-3C are waveform diagrams illustrating the introduction of periodic timing disturbances (i.e., micro-transitions) into a write signal sequence (such as write signal sequence 32 shown in FIG. 2) according to an embodiment of the present invention.

In particular, FIG. 3A illustrates square wave write signal 34 having a 2T write pattern. For example, square wave write signal 34 may be the type of write signal that would be generated from write signal sequence 32 (shown in FIG. 2) if no periodic disturbances were introduced into the write signal.

FIG. 3B illustrates square wave write signal 36 after the introduction of periodic micro-transitions 38a and 38b. In the embodiment shown in FIG. 3B, every 8$^{th}$ transition of write signal 36 is delayed by a predetermined amount corresponding to the desired width of the micro-transition pulse. However, in other embodiments the transition of write signal 36 (positive or negative) may be advanced, rather than delayed. In one embodiment, the length of the delay (i.e., width of the micro-transition) is selected to be less than 25% of the period of write signal 34. In another embodiment, the length of the delay (i.e., width of the micro-transition pulse) is selected to be approximately 10% of the period of write signal 34.

FIG. 3C illustrates the resulting error signal that results from the insertion of micro-transitions 38a and 38b, wherein the error signal represents the difference between the original square wave write signal 36 and the resulting signal following insertion of micro-transitions 38a and 38b. As illustrated in FIG. 3C, the error signal consists of isolated, unipolar magnetization pulses 40a and 40b. Because the timing shift introduced by the delay (or advancement) of the timing signal is relatively small, the effective "width" of magnetization pulses 40a and 40b is similarly small (e.g., fraction of a nanometer (nm)). As a result, magnetization pulses 40a and 40b are similar to a magnetization delta-function in the down-track direction.

Figure 4:
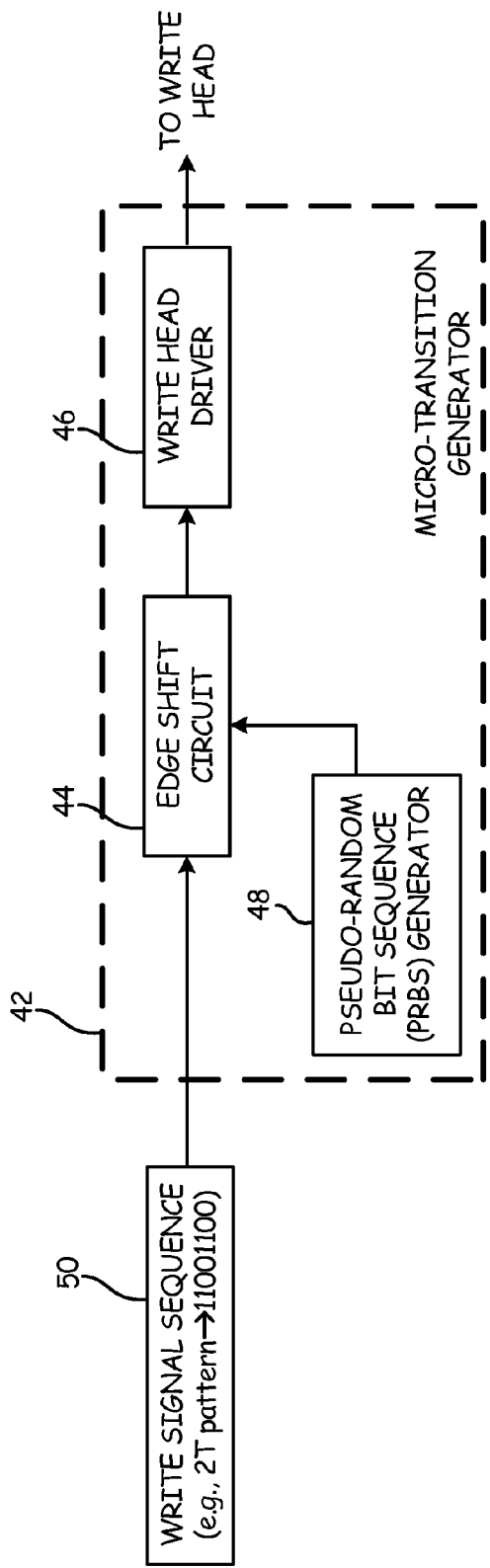
FIG. 4 is a schematic diagram of a micro-transition generator according to another embodiment of the present invention.

FIG. 4 is a schematic diagram of micro-transition generator 42 according to another embodiment of the present invention. The operation of micro-transition generator 42 will be discussed with reference to FIG. 5, which illustrates waveform diagrams of the pseudo-random bit sequence generated by PRBS generator 48 and the resulting write signal sequence as modified by edge shift circuit 44.

Micro-transition generator 42 includes edge shift circuit 44, write head driver 46, and pseudo-random bit sequence (PRBS) generator 48. Micro-transition generator 42 operates to add timing disturbances into write signal sequence 50. However, in contrast with the embodiment shown in FIG. 2, in which timing disturbances (i.e., micro-transitions) were introduced to a square wave write signal at a fixed period (e.g., every 8$^{th}$ transition), the embodiment shown in FIG. 4 introduces pseudo-random timing disturbances into each transition of write signal sequence 50.

In the embodiment shown in FIG. 4, write signal sequence 50 once again has a 2T write pattern, and is provided as input to edge shift circuit 44, which introduces timing disturbances based on a pseudo-random bit sequence 52 (shown in FIG. 5) generated by PRBS generator 48. Although pseudo-random bit sequence 52 is described as pseudo-random, the sequence will have a defined period. As such, the spectral component introduced to the square wave write signal has a frequency component that can be analyzed in the frequency domain based on amplitude of discrete spectral lines occurring at a particular frequency and harmonics thereof. In contrast, if pseudo-random bit sequence 52 were truly random, then the resulting frequency response to the introduced micro-transitions would not provide discrete spectral lines at a particular frequency and harmonics thereof. An important property of maximal-length pseudo-random sequences (such as those introduced via, for example, a finite state machine PRBS generator) is that all harmonics (except for the DC term) have the same amplitude, as do the harmonics of a periodic series of isolated impulses.

Edge shift circuit 44 adds timing disturbances into write signal sequence 50 by either advancing or delaying transitions associated with write signal sequence 50 based on the state of the pseudo-random bit sequence 52 provided by PRBS generator 48. In one embodiment (shown in FIG. 5), if the pseudo-random bit sequence 52 is logic high (e.g., logic-level '1'), then edge shift circuit 44 delays the transition of write signal sequence 50 by a determined length. Conversely, if pseudo-random bit sequence 52 is logic low (e.g., logic-level '0'), then edge shift circuit 44 advances the transition of write signal sequence 50 by a determined length. For example, the first three transitions (including both positive and negative transitions) of write signal sequence 50 are delayed because during the transitions the pseudo-random bit sequence 52 is logic high. The next transition is advanced because the pseudo-random bit sequence 52 is logic low. In one embodiment, the length of the delay or advancement is predetermined, and remains constant for each transition. However, in other embodiments the length of the delay or advancement may be varied.

A benefit of introducing micro-transitions according to a pseudo-random bit sequence is that each transition of write signal sequence 50 is utilized. As a result of modifying every transition, the introduced spectral component will have a higher power component than spectral components introduced at every nth transition. For example, frequency response amplitude of micro-transitions introduced to a 2T write pattern by a pseudo-random bit sequence having a period of 15T will have fifteen times the power of micro-transitions introduced at every $15^{th}$ transition of a 2T write pattern.

In another embodiment, rather than advance/delay the transition of write signal sequence 50 based on the logic level of pseudo-random bit sequence 52, edge shift circuit 44 modifies transitions according to a product of pseudo-random bit sequence 52 and the polarity of the transition. For example, pseudo-random bit sequence 52 are accorded a value of either +1 or −1, and transitions are accorded a value of +1 if rising or −1 if falling. If the product of these values is positive (e.g., (+1)*(+1) OR (−1)*(−1)), then transition is advanced (or delayed). Conversely, if the product of these values is negative (e.g., (+1)*(−1) or (−1)*(+1)), then the transition is delayed (or advanced, as appropriate).

There are several distinctions between the various methods of introducing micro-transitions via PRBS generator 48. For example, in the embodiment in which transitions are advanced or delayed based on the polarity of pseudo-random bit sequence 52, the polarity of the magnetization pulse (i.e., the difference or error) is inverted at every other transition based on the transition direction of the square wave signal. As a result, the period of the pseudo-random sequence is doubled (resulting in a lower frequency spectral component), but also to a frequency response that only includes odd harmonics of the double-length period. In contrast, in the embodiment in which transitions are advanced or delayed based on the product of the pseudo-random bit sequence and the polarity of the transition, the period of the pseudo-random sequence remains unchanged and the frequency response includes both even and odd harmonics.

Edge shift circuit 44 provides write signal sequence 54 (shown in FIG. 5) to write head driver 46, which causes the write signal sequence to be written to write head 18 (shown in FIG. 1). As described with respect to FIG. 2, edge shift circuit 44 may once again be implemented with a pre-compensation circuit to provide the desired delay or advancement of each transition of the write signal.

Figure 5:
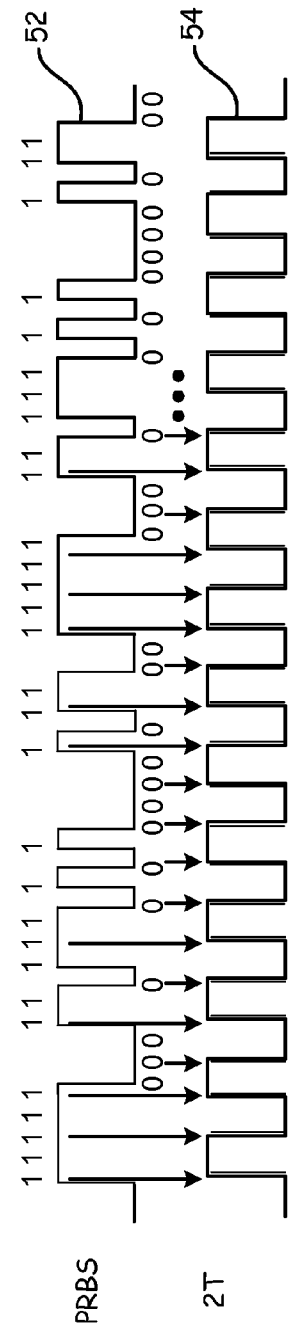
FIG. 5 is a waveform diagram illustrating the introduction of pseudo-random timing disturbances (i.e., micro-transitions) into a data write pattern according to another embodiment of the present invention.

As illustrated in the embodiment shown in FIG. 5, the timing disturbances (i.e., micro-transitions) introduced into the write signal sequence 50 occur at every transition of write signal sequence 50. The resulting error signal between the original write signal sequence 50 and write signal with embedded timing disturbances results in the introduction of a plurality of short magnetization pulses (not shown) that introduce a spectral component into the write signal and subsequent read-back signal. Because the timing shift introduced by the delay (or advancement) of the timing signal is relatively small, the effective "width" of magnetization difference pulses will once again be small (e.g., fraction of a nanometer (nm)). As a result, the magnetization pulses (not shown) are similar to a magnetization delta-function in the down-track direction. In addition, a benefit of introducing micro-transitions at each transition of write signal sequence 50 is a strong signal-to-noise ratio of the micro-transition frequency response.

Figure 6:
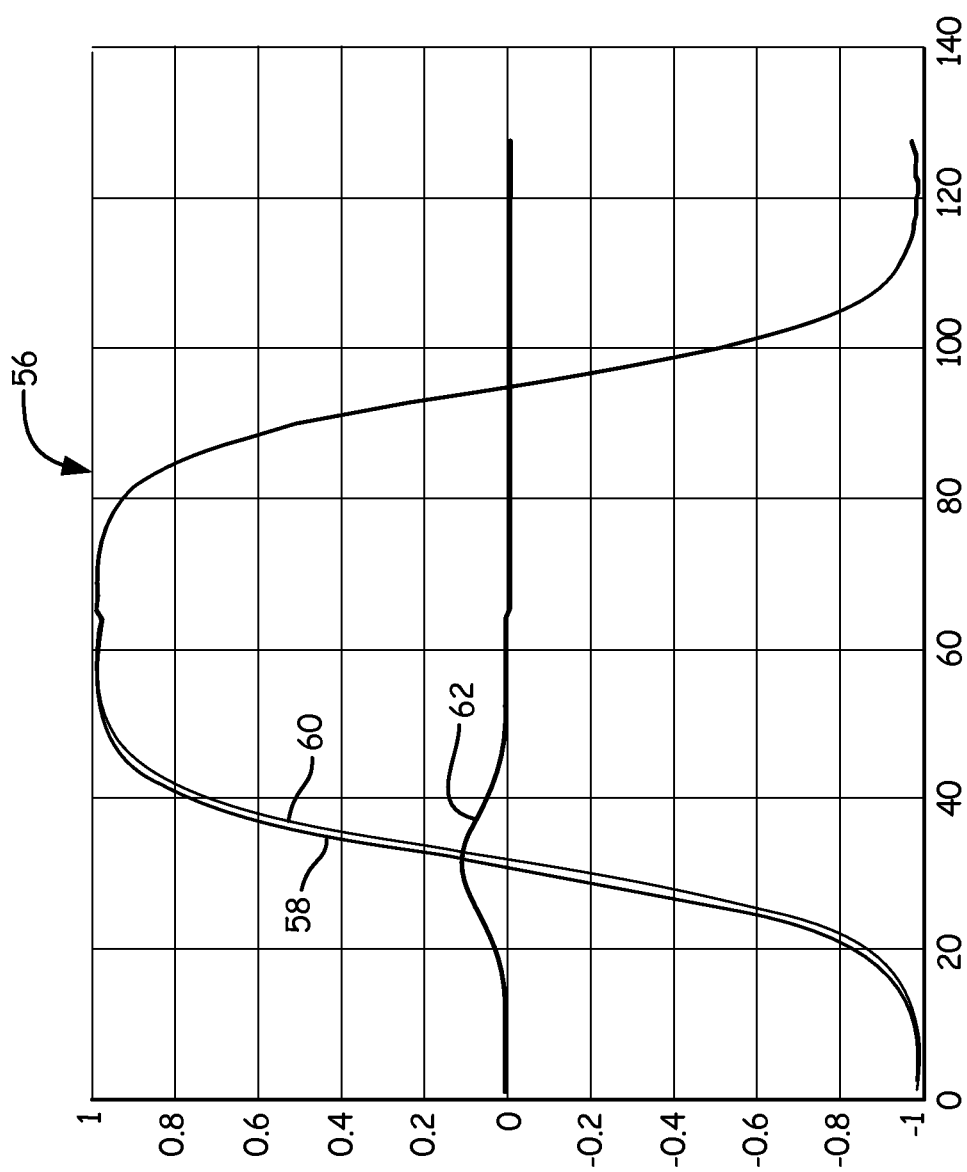
FIG. 6 is a waveform diagram illustrating a read-back signal sensed by a read head that includes a periodic timing disturbance (e.g., micro-transition) according to an embodiment of the present invention.

FIG. 6 is a waveform diagram that illustrates how the introduction of a timing disturbance (i.e., micro-transitions) in the write signal affects the read-back signal generated by read head 20 (shown in FIG. 1). In the embodiment shown in FIG. 6, two read-back signals are shown; read-back signal 58 having an embedded micro-transition, and read-back signal 60 having no embedded micro-transition. Once again, it is understood that read-back signal 58 and read-back signal 60 would not both be generated by read head 20. Rather, the read-back signals are illustrated alongside one another to illustrate the effect of introducing a micro-transition into the write signal.

In the embodiment shown in FIG. 6, the transition of the write signal sequence was advanced by a determined length (as described, for example, with respect to micro-transition generators 24 and 42 shown in FIGS. 2 and 4, respectively), such that read-back signal 58 leads the read-back signal 60. The resulting difference between read-back signal 58 and read-back signal 60 is represented by micro-transition read-back signal 62. The length of the timing disturbance embedded within the write signal (e.g., the width of the micro-transition pulse) determines the amplitude of micro-transition read-back signal 62. In the embodiment shown in FIG. 6, the amplitude of micro-transition read-back signal 62 is maintained within the linear region L1 (e.g., between approximately −0.6 and 0.6) of the read sensor 20. Outside of the linear region L1, saturation of read sensor 20 introduces non-linearities into the read-back signal. Operation in the linear region L1 is a function, in part, of the period of the write signal to which the micro-transitions are introduced (described in more detail with respect to FIGS. 10A-12). For example, micro-transitions introduced into a write signal sequence 50 having a small response (e.g., a period of 3T or 4T) will provide a response in the linear region L1, while a write signal sequence 50 having a larger signal response (e.g., a period of 10T) will experience more distortion due to saturation of read head sensor 20. In this way, proper selection of the write signal sequence 50 allows the performance of read sensor 20 to be analyzed without having to account for nonlinearities of read sensor 20.

Figure 7:
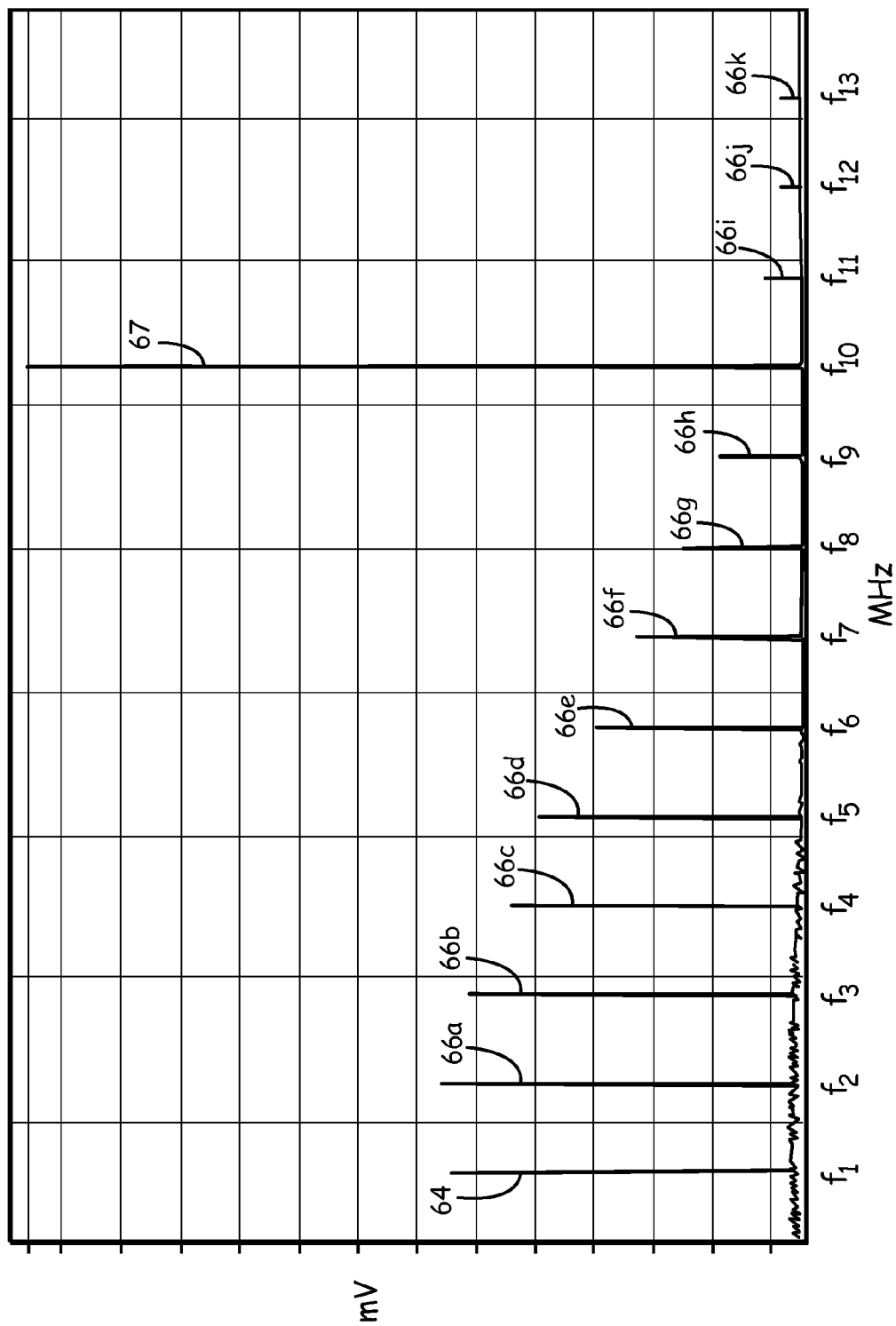
FIG. 7 is a frequency domain diagram illustrating the frequency response of the read-back signal sensed by the read head according to an embodiment of the present invention.

FIG. 7 is a frequency domain diagram illustrating the frequency response of the read-back signal including micro-transitions according to an embodiment of the present invention. In the embodiment shown in FIG. 7, the x-axis represents frequency expressed in units of Mega-Hertz (MHz). The y-axis represents amplitude of the frequency response expressed in units of milli-Volts (mV). In one embodiment, the frequency response is the result of a discrete Fourier transform (DFT) or similar function for converting signals from a time-domain to a frequency domain. For example, in the embodiment shown in FIG. 1, spectrum analyzer 14 calculates the frequency response associated with the read-back signal provided by read head 20.

The frequency response illustrated in FIG. 7 is described with reference to a 2T write pattern having a 4T period that includes periodic micro-transitions provided at every $10^{th}$ transition, resulting in a micro-transition period of 20T. A similar frequency response may be obtained by introducing pseudo-random timing disturbances into the write signal as described with respect to FIGS. 4 and 5. In the embodiment shown in FIG. 7, the 4T period of the write signal results in a 4T fundamental frequency 67 centered at frequency $f_{10}$. The 20T period of the introduced micro-transitions results in a 20T fundamental frequency 64 centered at frequency $f_1$. In addition, a plurality of harmonics 66a-66k of fundamental frequency 64 are provided at multiples of frequency f1 (e.g., $f_2$-$F_{13}$).

As described above with respect to FIG. 6, selection of the write signal sequence period ensures that read-back of the introduced micro-transitions are provided within the linear range of read sensor 20. This is illustrated in FIG. 7, in which the amplitude of the 20T fundamental frequency 64 associated with the micro-transitions is substantially smaller than the amplitude of the 4T fundamental frequency 67 associated with the write signal. It should be noted that the amplitude of the 4T fundamental frequency 67 has been truncated to allow the micro-transition frequency response to be illustrated more easily. In addition, FIG. 7 illustrates the roll-off in amplitudes associated with harmonics 66a-66k. As described in more detail with respect to FIG. 8, amplitude roll-off is used to determine parameters such as read head resolution.

Figure 8:
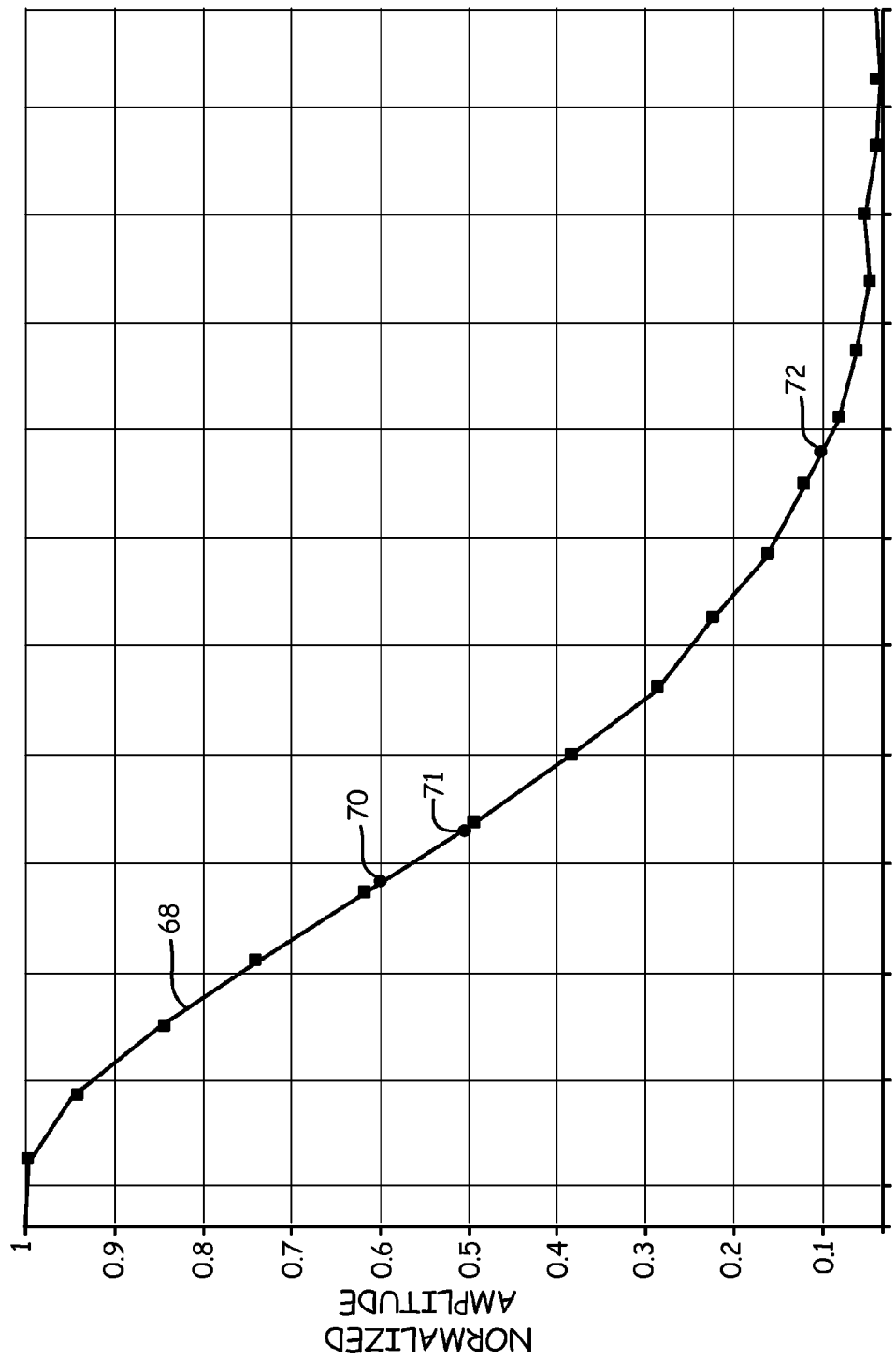
FIG. 8 is a normalized frequency domain diagram illustrating measurement of read sensor resolution based on the normalized micro-transition frequency response according to an embodiment of the present invention.

FIG. 8 is a normalized frequency domain diagram illustrating measurement of read sensor resolution based on the normalized frequency response curve of the read-back signal according to an embodiment of the present invention. The normalized frequency response curve illustrated in FIG. 8 is based on the frequency response illustrated in FIG. 7. In particular, the amplitudes associated with the micro-transition frequency response are normalized (i.e., highest amplitude is set to a value of '1', and all others are divided by the amplitude of the highest amplitude to provide values less than '1'). Curve 68 is fitted to the plurality of normalized amplitudes, and used to calculate parameters associated with read head 20.

For example, a commonly calculated parameter associated with read head resolution is a T50 parameter, which is expressed in units of length and represents the width between points of the read-back signal corresponding to a 50% amplitude threshold. If the read head is heavily saturated, then the T50 parameter will have a larger value, indicating lower resolution than a read head having a smaller T50 parameter. In the embodiment shown in FIG. 8, the T50 parameter is corresponds to a roll-off value of approximately 60% (e.g., 0.6) as indicated by location 70, wherein the period of the frequency associated with location 70 (expressed in units of length) represents the T50 parameter. Because the T50 parameter is based on roll-off of the micro-transition frequency response, the parameter is free of saturation effects associated with magnetic transducer (e.g., saturation of read head 20). In this way, a T50 parameter is obtained that is free of saturation effects associated with read head 20 and/or write effect nonlinearities.

In addition, a plurality of other useful parameters may be extracted from curve 68, including 50% roll-off value (indicated by location 71) and 10% roll-off value (indicated by location 72), which are similarly free of saturation effects and provide an indication of read head resolution. In addition, read head resolution may also be defined as a ratio (or percentage of the frequency response at different write pattern densities. For example, 2T/10T resolution is defined as the micro-transition frequency response at 2T divided by the micro-transition frequency response at 10T. This ratio is oftentimes expressed as a percentage, rather than a ratio. Among other things, roll-off values are utilized to determine and modify spacing between read head 20 and magnetic media 22. The spacing between read head 20 and magnetic media 22 is based, in part, on a tiny thermal micro-actuator. Based on the measured roll-off values, the thermal micro-actuator is utilized to modify the spacing between read head 20 and magnetic media 22. A benefit of utilizing the micro-transition frequency response to determine transducer spacing (e.g., read head spacing), as opposed to the typical read-back signal, is that the micro-transition frequency response is not as susceptible to saturation of the read sensor caused by either sensor nonlinearity or excessive flux from the magnetic media 22.

Figure 9:
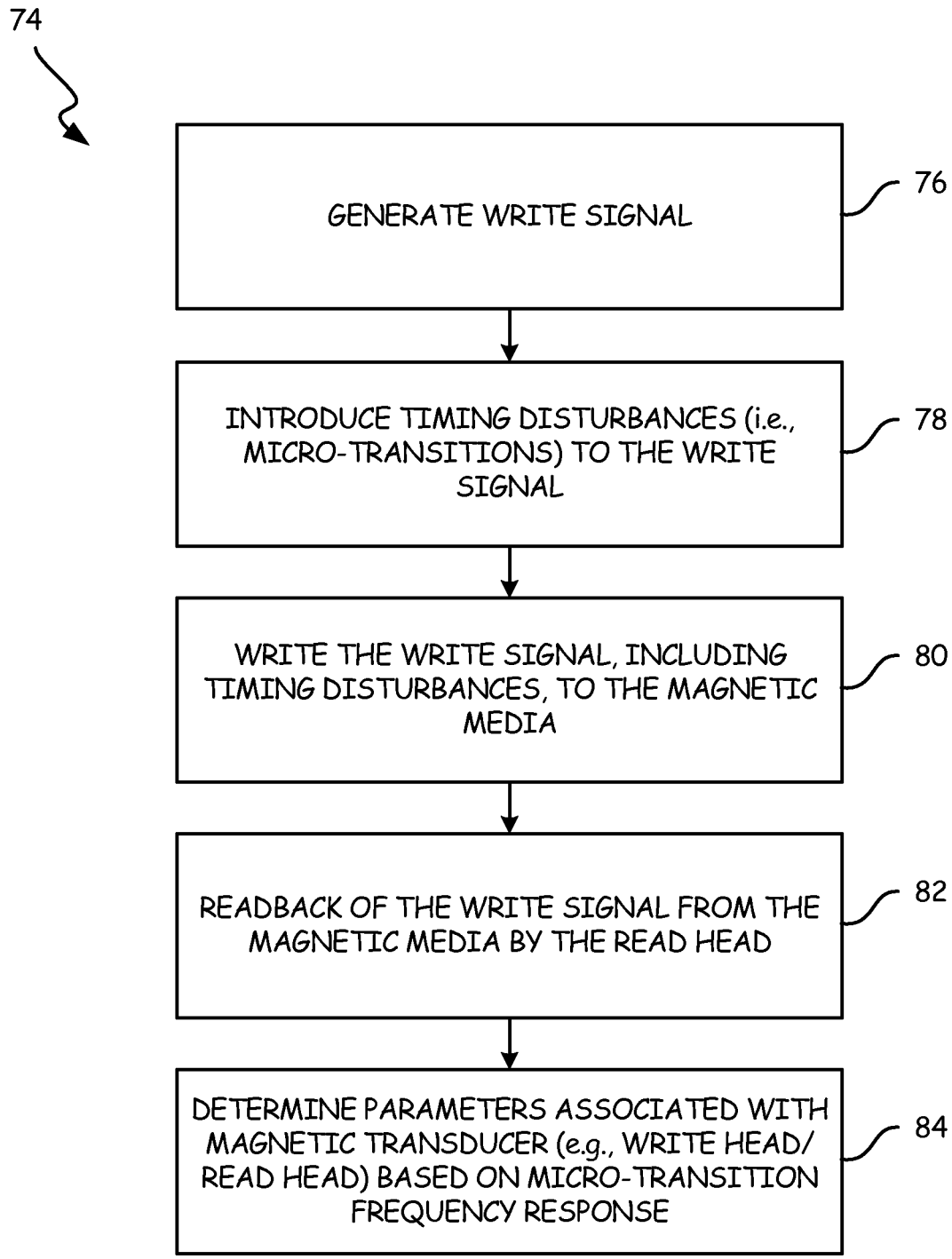
FIG. 9 is a flowchart illustrating a method of measuring of read head resolution according to an embodiment of the present invention.

FIG. 9 is a flowchart illustrating method 74 of measuring read head resolution according to an embodiment of the present invention. At step 76, a write signal sequence is generated and received by the micro-transition generator. As described with respect to FIGS. 2 and 4, in most cases the write signal sequence is represented as a square wave signal. In one embodiment, the density of the write signal sequence (e.g., the period of the write signal) is selected to minimize the effects of read head and write head nonlinearities. For example, in one embodiment the pattern of the write signal sequence is selected to be 3T. In other embodiments, write signal sequence may have a longer period (e.g., 4T, 6T, 10T, etc.), but as the period of the write signal sequence increases (resulting in a lower density write signal), the greater the effect write head and read head nonlinearities will have on the micro-transition frequency response.

At step 78, timing disturbances are added to the received write signal sequence. As discussed with respect to the FIGS. 2 and 4, timing disturbances may be periodic or aperiodic. If periodic, then timing disturbances are repeated every $n^{th}$ transition of the write signal. If pseudo-random, then micro-transitions are introduced at each transition of the write signal. The micro-transitions may result in the write signal transition being advanced or delayed. For example, in the embodiment in which timing disturbances are periodic, every nth transition may be advanced (or delayed) by a predetermined amount. In one embodiment, the width of each micro-transition is selected to be less than 25% of the write signal period.

At step 80, the write signal, including introduced micro-transitions, is written to the magnetic media by the write head.

At step 82, the read head generates a read-back signal in response to the write signal previously written to the magnetic media.

At step 84, parameters associated with the read head (such as read head resolution, and T50 parameters) are determined based on the frequency response of the read-back signal to the embedded micro-transitions. As described above, the frequency response to the embedded micro-transitions is (relatively) free of saturation effects associated with the write head and read head, which would otherwise introduce nonlinearities into the read-back signal. As a result, the frequency response to the embedded micro-transitions can be used to determine a variety of parameters associated with the read head, including read head resolution and T50 parameters. These parameters can be determined based on the frequency response of the read-back signal, which only requires a relatively simple transform from the time domain to the frequency domain (e.g., discrete Fourier transform (DFT)).

In the embodiments described with respect to FIGS. 1-9, a plurality of timing disturbances (i.e., micro-transitions) were introduced into a write signal to introduce spectral components into the read-back signal that are substantially free of saturation effects associated with the read head and/or the write head. In the embodiments described with respect to FIGS. 10A-12, micro-transitions are embedded into different types of write signals (e.g., high-density and low-density write signals), and the frequency response to the introduced micro-transitions within the two different write signals is used to determine nonlinearities associated with the magnetic transducer, including nonlinearities introduced by write head 18 and by read head 20.

Figure 10A:
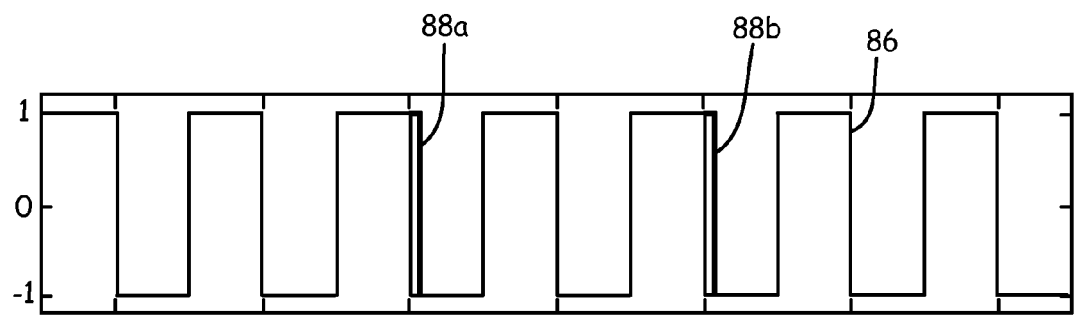
FIG. 10A-10C are waveform diagrams illustrating the introduction of timing disturbances (micro-transitions) into a low-density data write pattern and a high-density data write pattern according to an embodiment of the present invention.
Figure 10B:
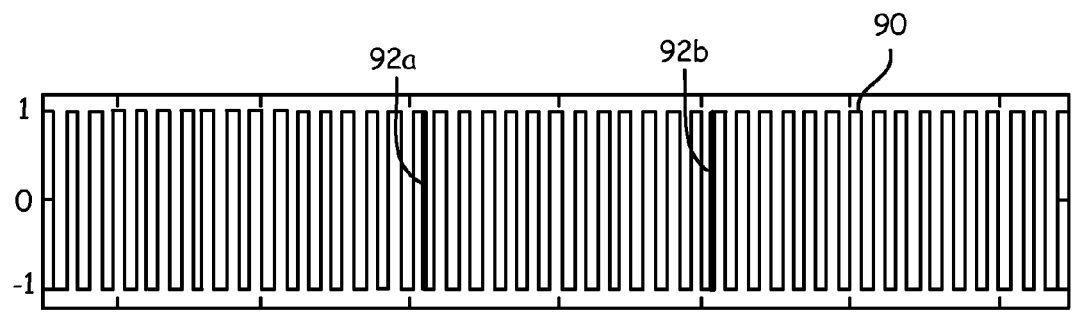
Figure 10C:
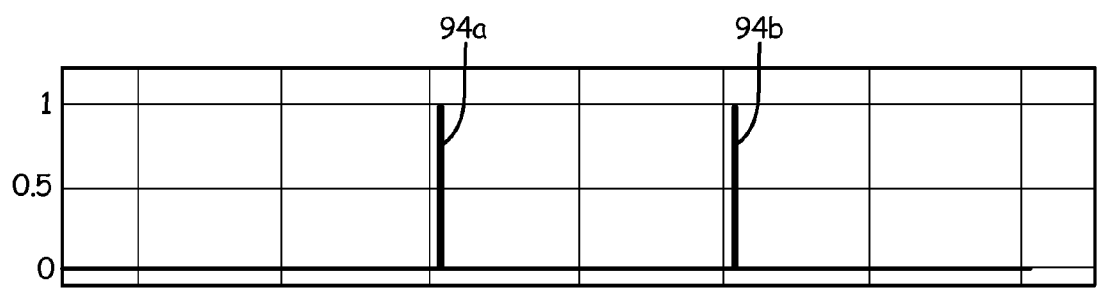

FIG. 10A-10C are waveform diagrams illustrating the introduction of periodic timing disturbances (micro-transitions) into a low-density data write pattern and a high-density data write pattern according to an embodiment of the present invention.

In particular, FIG. 10A illustrates low-density square wave write signal 86 having a plurality of introduced micro-transitions 88a and 88b. FIG. 10B illustrates high-density square wave write signal 90 having a plurality of introduced micro-transitions 92a and 92b. For purposes of this description, write signal 86 is described as low-density because the period of the low-density write signal is greater than the period of the high-density write signal to which it is compared and because the amplitude is close to the maximum amplitude available through the writing and reading process. For example, in one embodiment low-density square wave write signal 86 has a period of 10T, while high-density square wave write signal 90 has a period of 2T. A high density square wave is such that the read-back signal amplitude is substantially smaller than the maximum (e.g., 50%).

As illustrated in FIGS. 10A and 10B, the micro-transitions introduced into both the low-density write signal and the high-density write signal are identical. If the micro-transitions are periodic, then the period of micro-transitions 88a and 88b introduced into low-density write signal 86 is equal to the period of micro-transitions 92a and 92b introduced into high-density write signal 90. If the micro-transitions are pseudo-random, then the same micro-transitions introduced into low-density write signal 86 may be stored and introduced into high-density write signal 90, with the net result being that the resulting error signal (or magnetization pulses 94a and 94b) shown in FIG. 10C for both the low-density write signal 86 and high-density write signal 90 are the same. For both periodic and pseudo-random micro-transitions, the length or width of the micro-transitions introduced into low-density write signal 86 is equal to the length or width of the micro-transitions introduced into high-density write signal 90.

Figure 11:
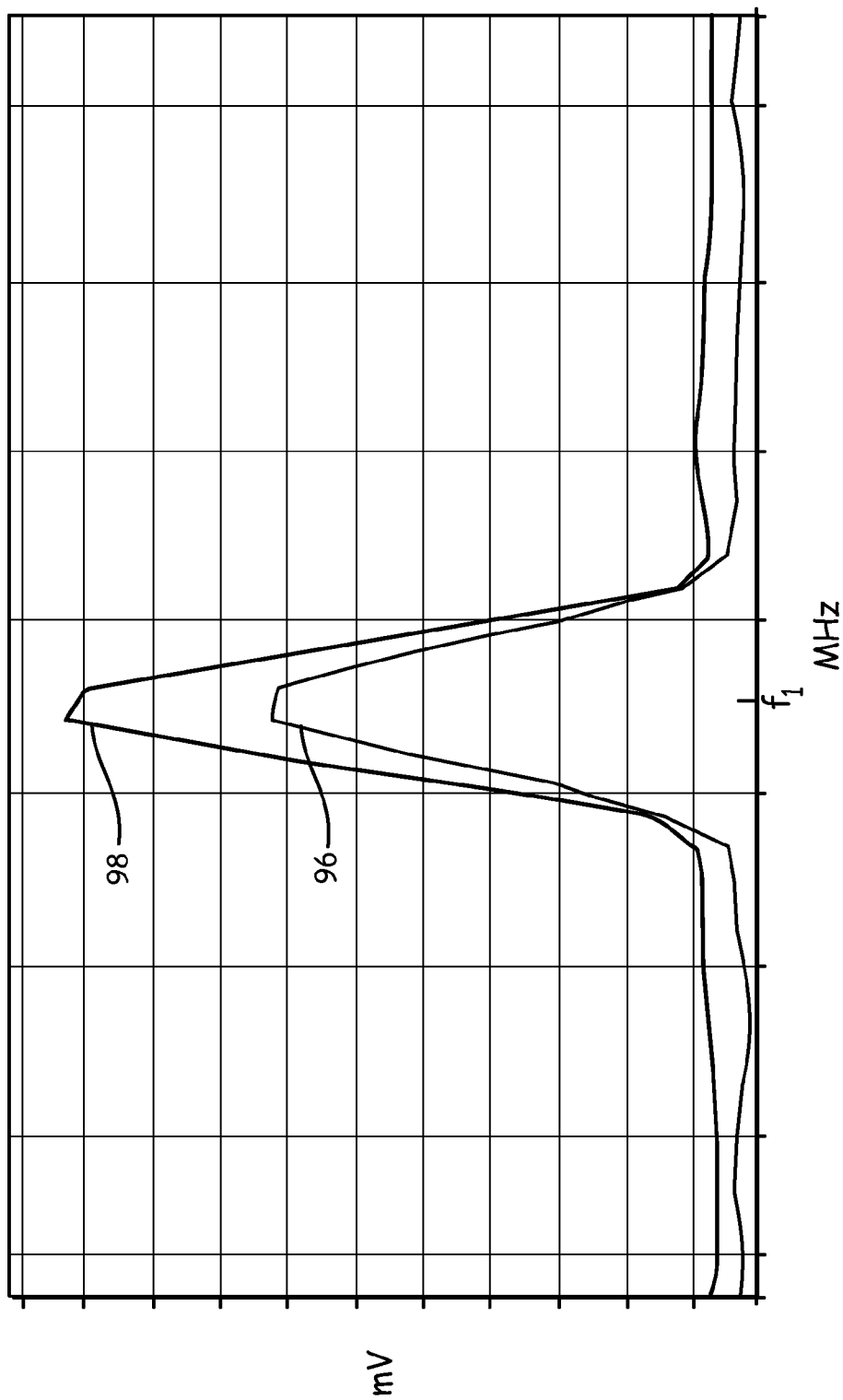
FIG. 11 is a frequency domain diagram illustrating the micro-transition frequency response (at a fundamental frequency) as measured with respect to a low-density data write pattern and a high-density data write pattern.

FIG. 11 is a frequency domain diagram illustrating the fundamental frequency response to the micro-transitions introduced into both a low-density data write pattern and a high-density data write pattern. The frequency response to the low-density write signal is illustrated by line 96, while the frequency response to the high-density write signal is illustrated by line 98. Once again, the x-axis represents frequency expressed in units of MHz, while the y-axis represents amplitude of the frequency response measured in units of mV.

For purposes of determining nonlinearities introduced by write head 18 and/or by read head 20 (as shown in FIG. 1), only the fundamental frequency associated with the introduced micro-transitions is analyzed. If write head 18 and read head 20 do not include any nonlinearities, then the frequency response associated with both low-density write signal 86 and high-density write signal 90 should be exactly the same because identical micro-transitions were introduced into both write signals. However, differences in the frequency response associated with low-density write signal 86 and high-density write signal 90 is indicative of nonlinearities associated with write head 18 and/or read head 20.

In the embodiment shown in FIG. 11, the amplitude of the frequency response associated with high-density write signal 98 is greater than the amplitude of the frequency response associated with low-density write signal 96. Sensor nonlinearities are determined based on the ratio of amplitudes associated with low-density write signal 96 and high-density write signal 98 (e.g., high-density amplitude divided by low-density amplitude). As described above, if write head 18 and read head 20 do not introduce any nonlinearities, then the ratio should be equal to one. Read head 20 nonlinearity (such as read head saturation) is indicated by a ratio greater than one (e.g., high-density frequency response greater than the low-density frequency response, as shown in FIG. 11). Write head nonlinearities (such as those introduced by partial erasure at very high data densities) are indicated by a ratio less than one (e.g., high-density frequency response less than the low-density frequency response). The extent or magnitude of the particular nonlinearities associated with write head 18 and/or read head 20 is indicated based on the deviation of the ratio value from a value of one. In this way, the frequency response associated with write signals of different densities (both including introduced micro-transitions) can be used to detect nonlinearities associated with write head 18 and read head 20. In the embodiment shown in FIG. 11, only two write signals (one high-density, one low-density) were employed, although in other embodiments a plurality of write signals having different periods may be employed to obtain a greater number of data points and associated ratios.

Figure 12:
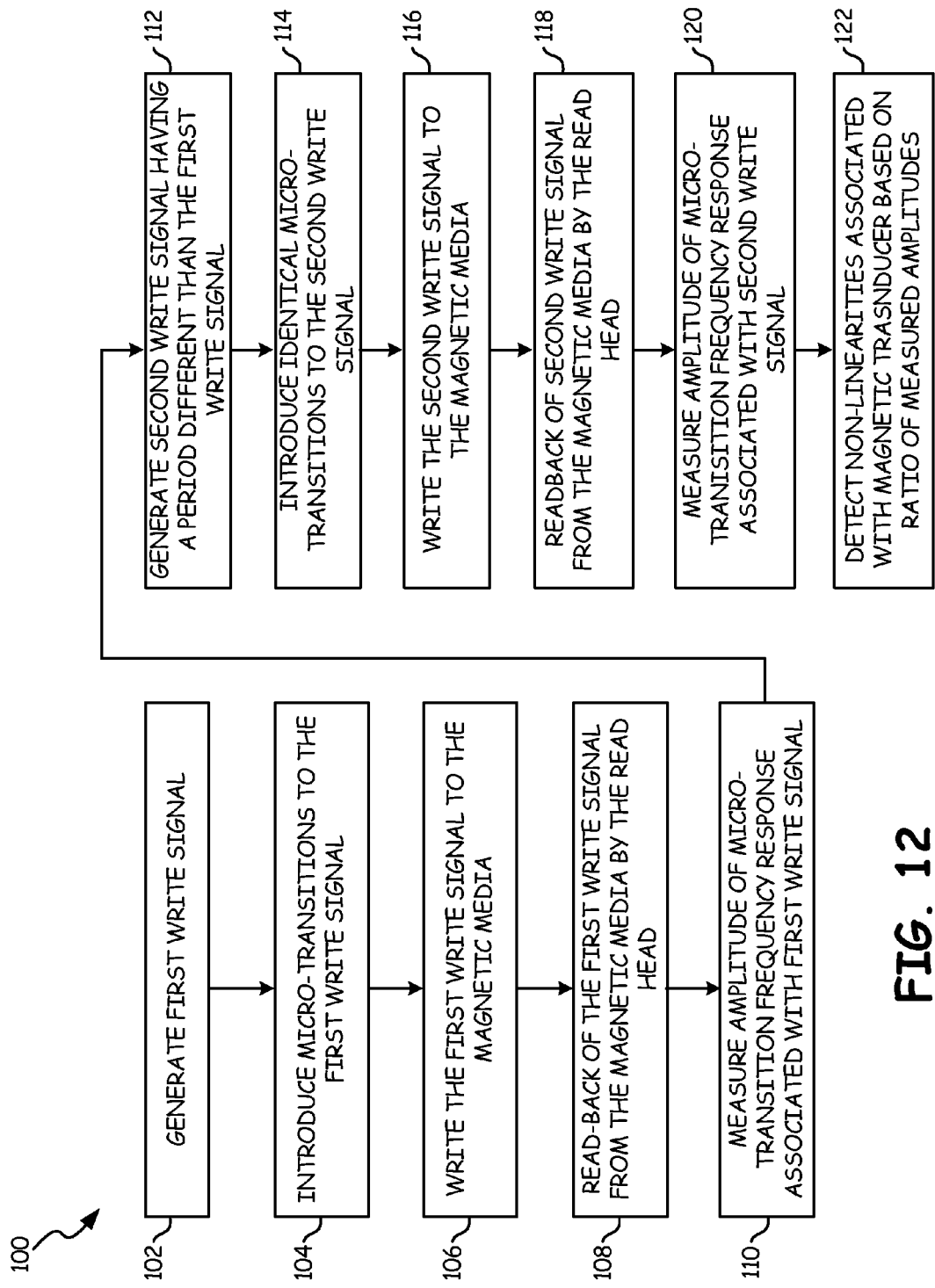
FIG. 12 is a flowchart illustrating a method of measuring nonlinearities associated with a magnetic transducer according to an embodiment of the present invention.

FIG. 12 is a flowchart illustrating method 100 of measuring nonlinearities associated with a magnetic transducer according to an embodiment of the present invention. At step 102, a first write signal is generated having a prescribed period (either high-density or low-density, based on the second write signal). At step 104, a first plurality of micro-transitions is introduced into the first write signal. At step 106, the first write signal (including first plurality of micro-transitions) is written to the magnetic media 22 via write head 18. At step 108, a read-back signal is generated by read head 20 in response to the first write signal written to magnetic media 22. At step 110, the amplitude of the frequency response to the introduced micro-transitions associated with the first write signal is measured. In one embodiment, this may include measuring only the amplitude of the fundamental frequency of the micro-transition frequency response.

At step 112, a second write signal is generated having a prescribed period greater than or less than the first write signal. At step 114, a second plurality of micro-transitions, identical to the first plurality of micro-transitions, is introduced into the second write signal. At step 116, the second write signal (including second plurality of micro-transitions) is written to the magnetic media 22 via write head 18. The second write signal may be written to the same or different portion of the magnetic media. At step 118, a read-back signal is generated by read head 20 in response to the second write signal written to magnetic media 22. At step 120, the amplitude of the frequency response to the introduced micro-transitions associated with the second write signal is measured.

Once again, this may include measuring only the amplitude of the fundamental frequency of the micro-transition frequency response. However, whichever frequency was used for measuring at step 110 above, the same frequency is employed at step 120 in order for the comparison of amplitudes to be meaningful.

At step 122, the measured amplitude associated with the first write signal is compared with the measured amplitude associated with the second write signal to detect nonlinearities associated with the write head and/or the read head. For example, three cases exist for detecting nonlinearities:

| Ratio = 1 | Linear Recording |
|---|---|
| Ratio > 1 | Read Head Nonlinearities (e.g., low-density saturation of read head, etc.) |
| Ratio < 1 | Write-process Nonlinearities (e.g., partial erasure at very high data densities, transition broadening effects, etc.) |

Wherein Ratio = High-Density Response/Low-Density Response

In this way, the introduction of micro-transitions into write signals having different periods, and the subsequent frequency response to the introduced micro-transitions can be used to detect non-linear effects associated with the write head and/or the read head.

FIGS. 13-16B illustrate how the frequency response to introduced micro-transitions can additionally be used to detect jitter associated with a particular magnetic media.

Figure 13:
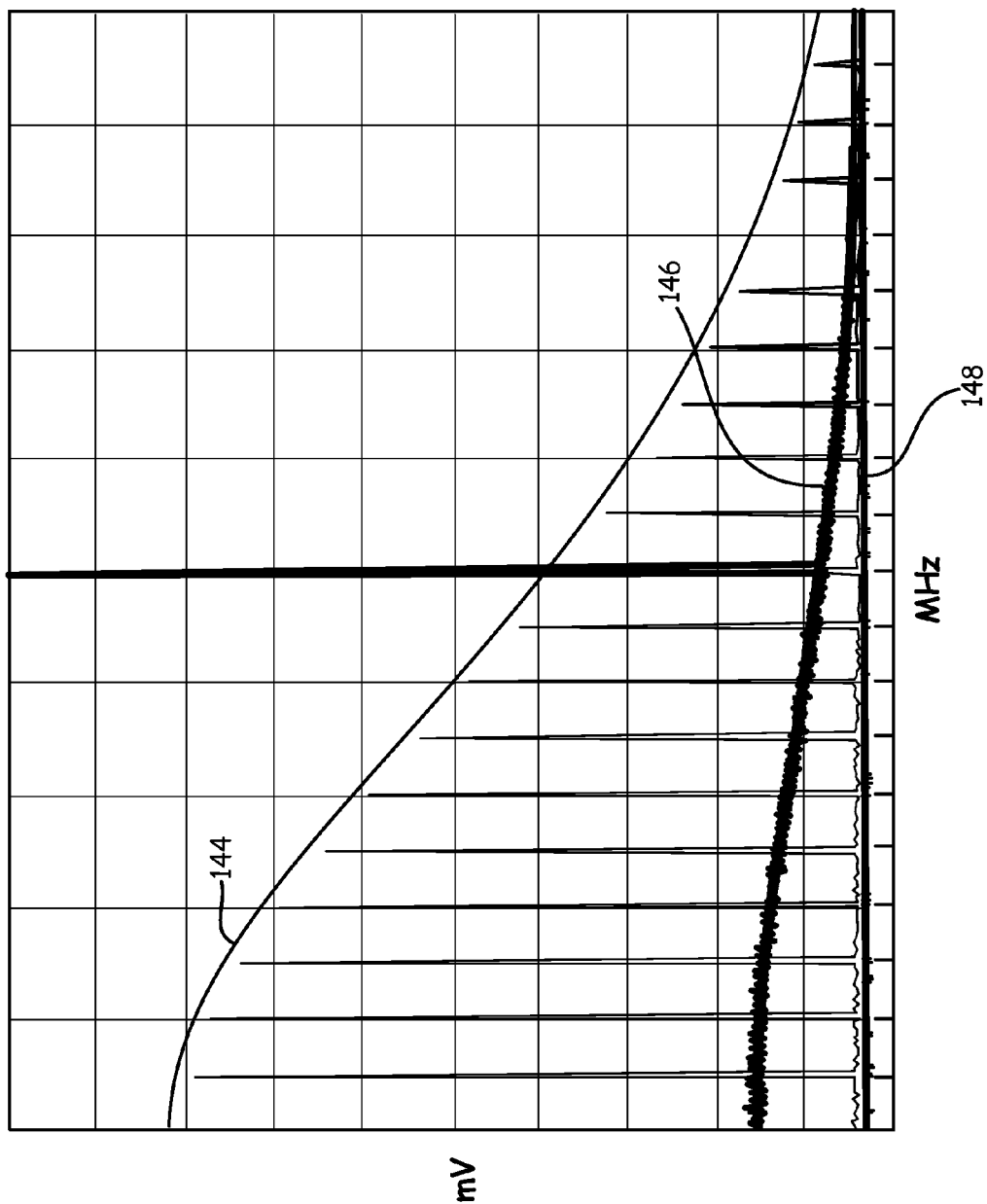
FIG. 13 is a frequency domain diagram illustrating the similarity between micro-transition frequency response and noise floor frequency response according to an embodiment of the present invention.

FIG. 13 is a frequency domain diagram illustrating the frequency response of a read-back signal that includes frequency response to micro-transitions introduced into the write signal illustrated by curve 144, frequency response associated with media noise (e.g., transition jitter) noise illustrated by line 146, and frequency response to head and electronics noise illustrated by line 148. In particular, FIG. 13 illustrates that the roll-off associated with the frequency response associated with jitter and DC noise (line 146) approximates the roll-off associated with the frequency response to the introduced micro-transitions (line 144). Based on this correlation, the introduction of micro-transitions and subsequent frequency response of the read-back signal to the introduced micro-transitions can be used to estimate the jitter and DC noise associated with data storage system 16 (shown in FIG. 1), and in particular to the magnetic media 22 associated with the data storage device.

Figure 14:
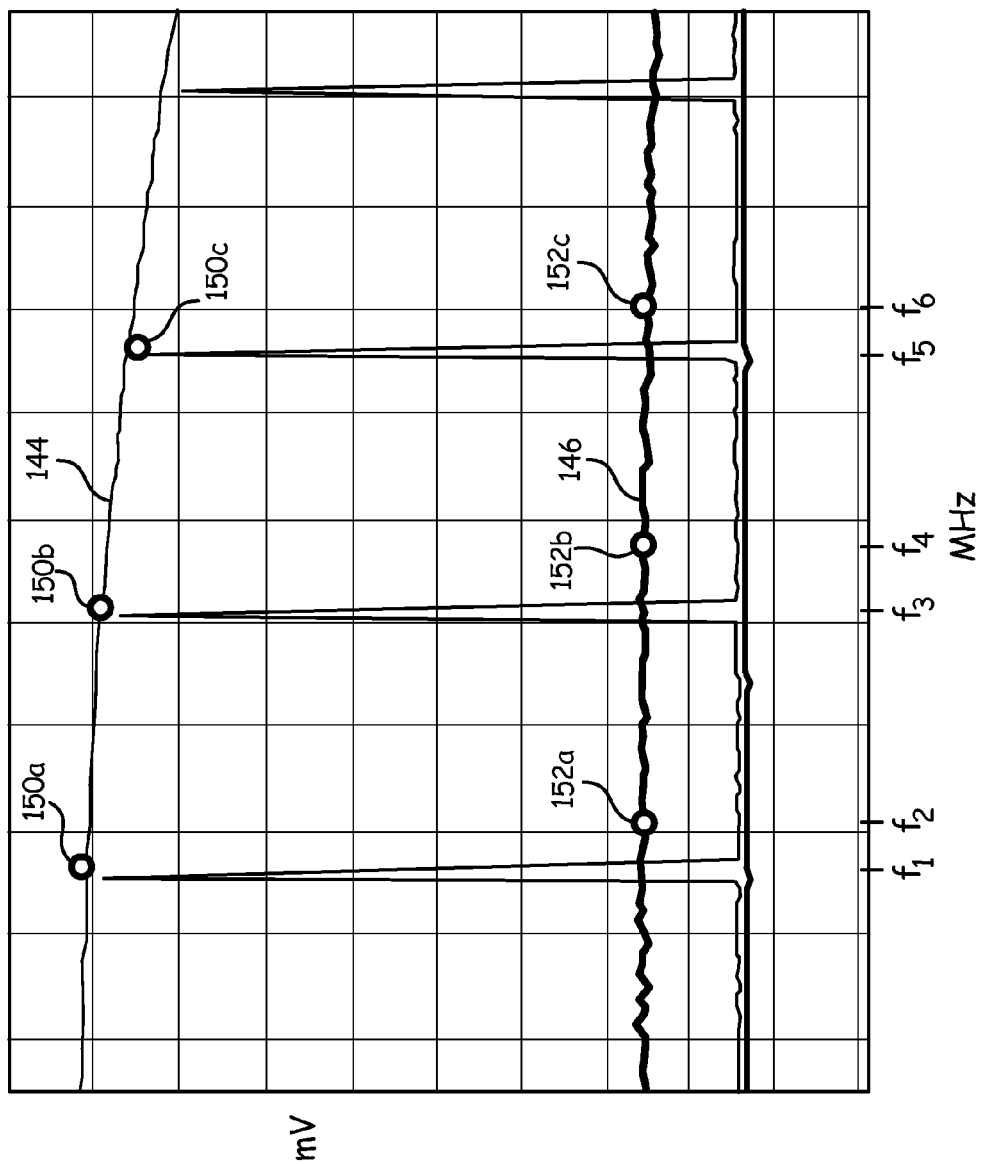
FIG. 14 is a frequency domain diagram illustrating measurement of micro-transition frequency response and noise floor frequency response used to calculated media noise (i.e., transition jitter) according to an embodiment of the present invention.

FIG. 14 is a frequency domain diagram illustrating amplitude measurements of the frequency response to measure jitter and DC noise associated with the magnetic media according to an embodiment of the present invention. In the embodiment shown in FIG. 14, harmonics of the fundamental frequency of the introduced micro-transitions occur at frequencies $f_1$, $f_3$, and $f_5$, and have amplitudes corresponding with points 150a, 150b, and 150c, respectively. In addition, by measuring the amplitude of the frequency response at frequencies near, but not equal to the harmonic frequencies, the frequency response of the jitter and DC noise can be measured. For example, in the embodiment shown in FIG. 14, frequency response amplitudes are measured at frequencies $f_2$, $f_4$, and $f_6$ at points 152a, 152b, and 152c, respectively. For example, the frequency $f_2$ is selected to be proximate or close to frequency $f_1$, without the measured amplitude at frequency $f_2$ corresponding with the frequency response to the micro-transition. Based on these measurements, the ratio of harmonic amplitude (measured at points 150a, 150b, and 150c) to noise floor (measured at points 152a, 152b, and 152c) can be used to calculate a jitter root mean square (RMS) value $\sigma$ based on the following equation:

$$\sigma = \frac{J}{A} \frac{\sqrt{RBW}}{m\sqrt{T}} \Delta \qquad \text{Equation 1}$$

wherein $$\frac{J}{A}$$

represents the ratio or measured noise floor amplitudes to measured harmonic amplitudes, RBW is the resolution bandwidth of the spectrum analyzer (e.g., 100 KHz), T is the period of the bit being recorded, m is the modulation period of the micro-transitions, and $\Delta$ is the length of the micro-transition included in the write signal. In this way, the frequency response to micro-transitions can additionally be used to detect a jitter RMS value associated with data storage device 16.

Figure 15:
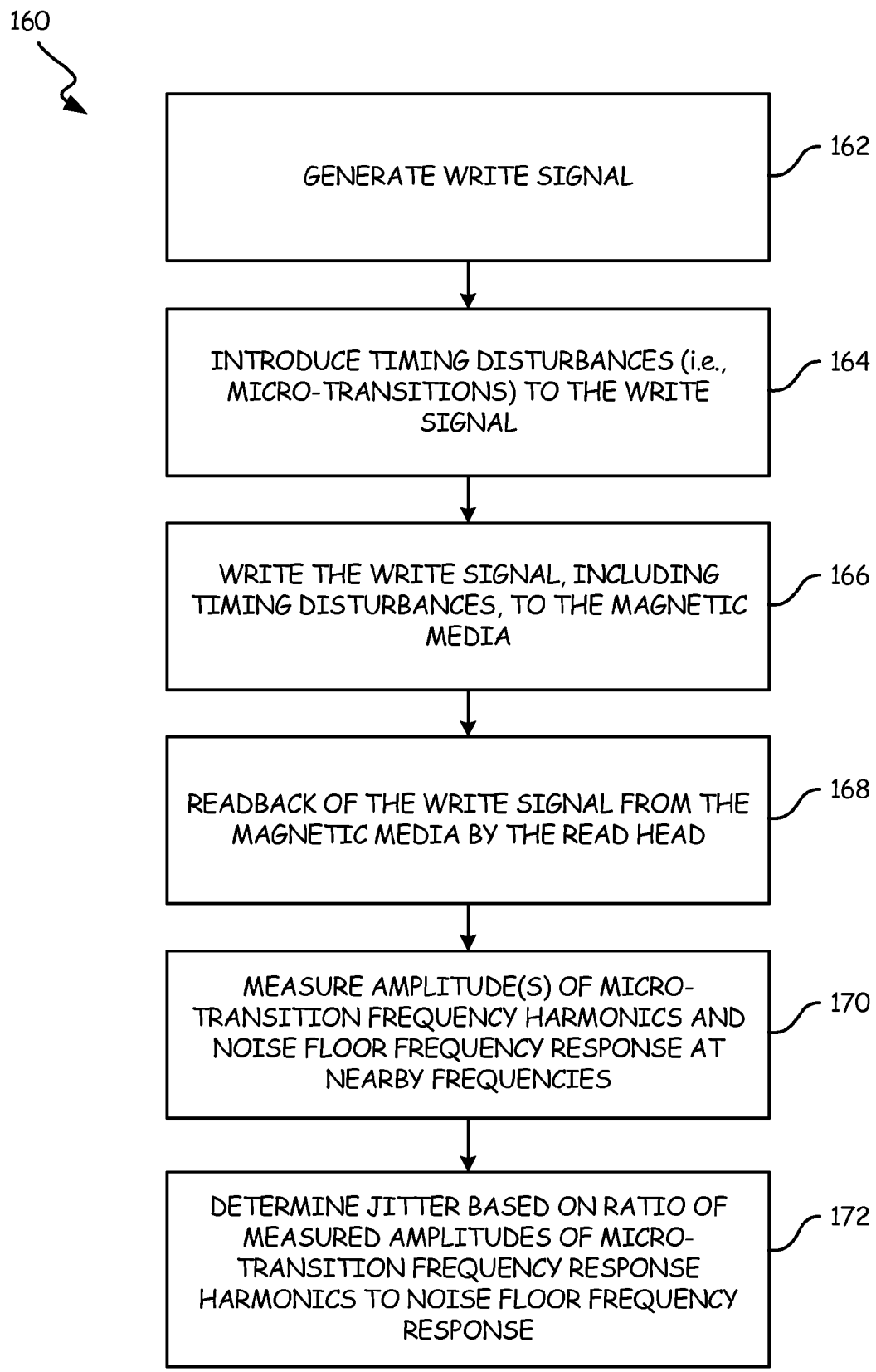
FIG. 15 is a flowchart illustrating measurement of media noise (e.g., transition jitter) according to an embodiment of the present invention.

FIG. 15 is a flowchart of method 160 used to measure DC and jitter noise (e.g., transition jitter) according to an embodiment of the present invention. At step 162, a write signal is generated. At step 164, a plurality of micro-transitions are introduced into the write signal, wherein the introduced micro-transitions may be periodic or aperiodic. At step 166, the write signal, including the introduced micro-transitions, is written to magnetic media 22 via write head 18. At step 168, a read-back signal is generated by read head 20 in response to the write signal written to magnetic media 22.

At step 170, amplitudes of the frequency response to the micro-transitions is measured. This may include measuring the amplitude of the fundamental frequency associated with the micro-transition frequency response, harmonics thereof, or a combination of both. In addition, at step 170, amplitudes of the noise floor frequency response are measured by measuring the frequency response amplitude at frequencies proximate to or nearby the measured micro-transition harmonics. This may include selecting a frequency slightly higher than, or slightly lower than the frequency of the micro-transition harmonic (or fundamental).

At step 172, the measured amplitudes associated with the micro-transition frequency response harmonics and noise floor frequency response are used to calculate a jitter RMS value that represents the average jitter value associated with data storage device 16, and more particularly associated with magnetic media 22.

Figure 16B:
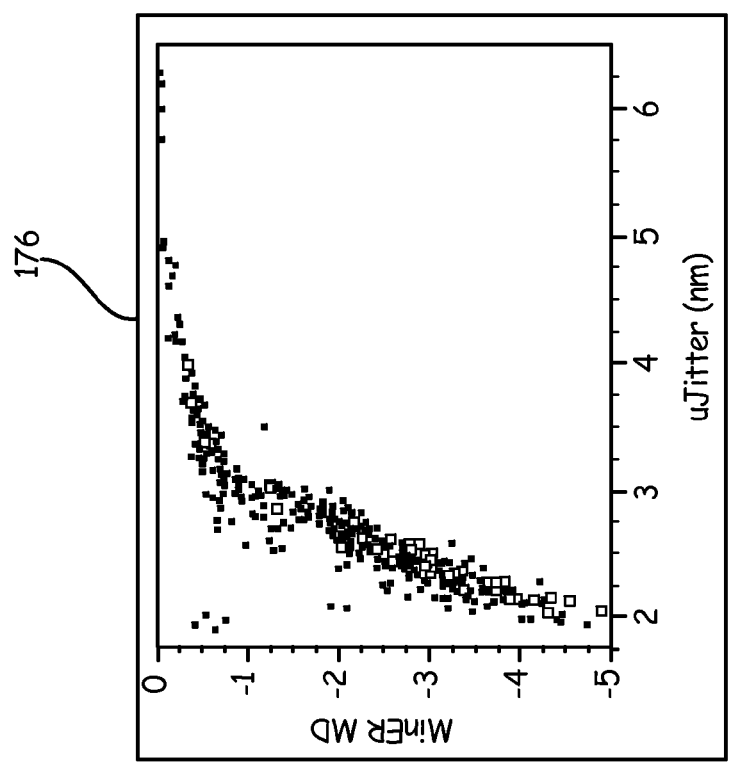
Figure 16A:
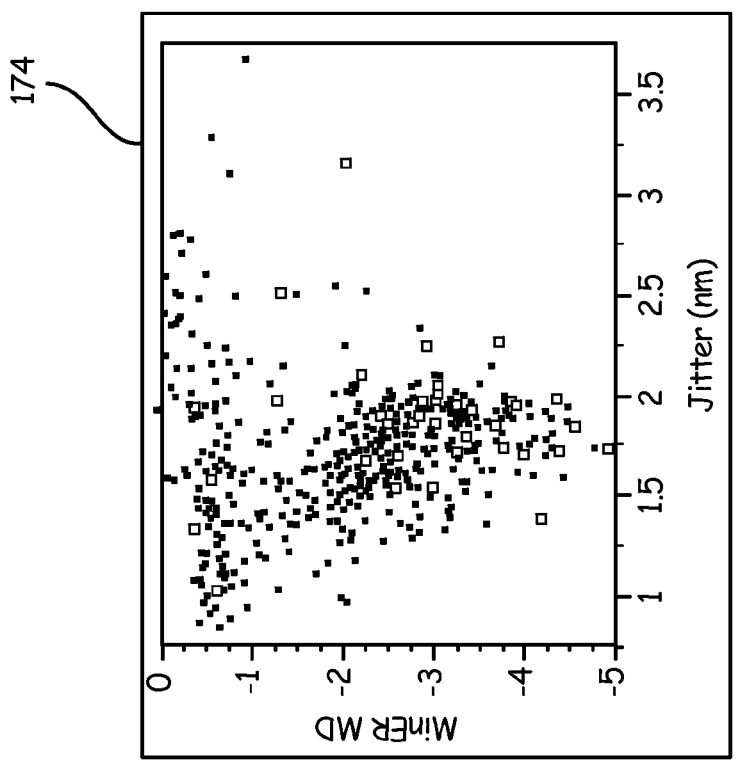

FIGS. 16A and 16B illustrate advantages of utilizing jitter calculations determined as described with respect to FIGS. 13-15 as compared with prior art methods. In particular, FIG. 16A illustrates the lack of correlation between jitter (calculated without the benefit of micro-transitions) and bit error rate. In contrast, FIG. 16B illustrates a strong correlation between micro-transition jitter measurements (labeled 'µJitter(nm)') and bit error rate measurements (labeled 'MinER MD'). In particular, as jitter increases, bit error rate measurement similarly increase. In this way, FIG. 16B illustrates a benefit of utilizing micro-transition jitter measurements in accurately correlating jitter with bit error rates.

As described with respect to the above-embodiments, the present invention provides a system and method of testing data storage systems by introducing timing disturbances (i.e., micro-transitions) into the write signal and analyzing the frequency response to the introduced disturbances in the read-back signal. The micro-transition frequency response can be used to detect resolution parameters associated with the read head (without interference from sensor nonlinearities), nonlinearities associated with the magnetic transducer (including nonlinearities introduced by the write head and nonlinearities introduced by the read head), and media noise (i.e., transition jitter) associated with the magnetic media. In addition, although not specifically addressed in the above embodiments, the introduction of micro-transitions into the write signal and subsequent analysis of micro-transition frequency response of the read-back signal has multiple extensions. For example, analysis of the micro-transition frequency response of cross-track measurements allows a cross-track profile of read sensor response at different frequencies to be determined.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of testing a one or more components of a data storage system, the method comprising:
   deliberately introducing a first plurality of micro-transitions into a first data write pattern;
   writing the first data write pattern, including introduced micro-transitions, to a magnetic media;
   generating a first read-back signal; and
   analyzing a frequency response of the first read-back signal that includes analysis of micro-transition frequency response to determine performance of the one or more components of the data storage system.

2. The method of claim 1, wherein the first plurality of micro-transitions are introduced at a selected period.

3. The method of claim 1, wherein the first plurality of micro-transitions are introduced pseudo-randomly at each transition of the first data write pattern.

4. The method of claim 1, wherein analyzing the frequency response of the first read-back signal includes:
   measuring amplitudes of the micro-transition frequency response; and
   calculating performance parameters associated with a read head of the data storage system based on the measured amplitudes of the micro-transition frequency response.

5. The method of claim 4, wherein calculating performance parameters associated with a read head of the data storage system includes calculating spacing between the read head and the magnetic media.

6. The method of claim 1, wherein the calculated read head performance parameters include read head resolution and T50 parameters calculated based on roll-off of the measured amplitudes of the micro-transition frequency response.

7. The method of claim 1, wherein analyzing the frequency response of the first read-back signal includes:
   measuring an amplitude of the micro-transition frequency response at a first frequency;
   measuring an amplitude of the frequency response at a second frequency proximate to the first frequency; and
   calculating media noise associated with the data storage system based, in part, on a ratio of the measured amplitudes.

8. The method of claim 1, further including:
   introducing a second plurality of micro-transitions into a second data write pattern, wherein a frequency of the second data write pattern is different than a frequency of the first data write pattern;
   writing the second data write pattern, including introduced micro-transitions, to the magnetic media;
   generating a second read-back signal; and
   comparing the micro-transition frequency response of the first read-back signal with a micro-transition frequency response of the second read-back signal to detect nonlinearities associated with the data storage system.

9. The method of claim 8, wherein the first data write pattern is a high-density data write pattern and the second data write pattern is a low-density data write pattern, wherein the frequency of the high-density data write pattern is greater than the frequency of the low-density data write pattern.

10. The method of claim 9, wherein comparing the micro-transition frequency response of the first read-back signal with a micro-transition frequency response of the second read-back signal includes:
    generating a ratio that compares amplitude of micro-transition frequency response of the first read-back signal with micro-transition frequency response of the second read-back signal; and
    detecting nonlinearities associated with a read head if the ratio is greater than one, and detecting nonlinearities associated with a write-process if the ratio is less than one.

11. The method of claim 1, wherein the first plurality of micro-transitions have a length less than 25% of a period of the first data write pattern.

12. The method of claim 1, wherein the first plurality of micro-transitions have a length of approximately 10% of a period of the first data write pattern.

13. A system for testing data storage systems, the system comprising:
    a micro-transition generator that deliberately introduces a first plurality of micro-transitions into a first data write signal;
    a write head that writes the first data write signal, including introduced micro-transitions, to a magnetic media;
    a read head that generates a first read-back signal in response to the first data write signal written to the magnetic media; and
    a spectrum analyzer that converts the first read-back signal to a frequency domain, and analyzes a frequency response of the read-back signal to determine performance of the one or more components of the data storage system.

14. The system of claim 13, wherein the micro-transition generator further includes:
    a counter that provides a periodic output based on a predetermined count value; and
    an edge-shift circuit that delays or advances a transition of the first data write signal by a predetermined amount based on the periodic output provided by the counter.

15. The system of claim 13, wherein the micro-transition generator further includes:
    a pseudo-random bit sequence (PRBS) generator that generates a pseudo-random sequence of bits; and an edge-shift circuit that delays or advances each transition of the first data write signal based on a state of the pseudo-random sequence of bits provided by the PRBS generator.

16. The system of claim 15, wherein the spectrum analyzer measures micro-transition frequency response amplitudes and calculates performance parameters associated with a read head of the data storage system based on the measured micro-transition frequency response amplitudes.

17. The system of claim 16, wherein the spectrum analyzer determines spacing between the read head and the magnetic media based on the measured micro-transition frequency response amplitudes.

18. The system of claim 16, wherein calculated performance parameters include a T50 parameter and resolution of the read-head based on roll-off of the measured micro-transition frequency response amplitudes.

19. The system of claim 13, wherein the spectrum analyzer measures micro-transition frequency response amplitudes at a first frequency, measures a frequency response amplitude at a second frequency proximate to the first frequency, and calculates media noise associated with the data storage system based, in part, on a ratio of measured amplitudes.

20. The system of claim 13, wherein the micro-transition generator introduces a second plurality of micro-transitions into a second data write signal, wherein the first data write signal is a high-density data write signal, and the second data write signal is a low-density write signal, and wherein the write head writes the second data write signal to the magnetic media.

21. The system of claim 20, wherein the read head generates a second read-back signal corresponding with the second data write signal, and wherein the spectrum analyzer detects nonlinearities associated with the write head and the read head based on a comparison of amplitudes associated with the micro-transition frequency response of the high-density write signal to a micro-transition frequency response of the low-density write signal.

22. The system of claim 20, wherein the spectrum analyzer detects nonlinearities associated with the read head if amplitude of the micro-transition frequency response to the high-density write signal is greater than an amplitude of the micro-transition frequency response to the low-density write signal.

23. The system of claim 20, wherein the spectrum analyzer detects nonlinearities associated with the write-process if the amplitude of the micro-transition frequency response to the high-density write signal is less than the amplitude of the micro-transition frequency response to the low-density write signal.

24. The system of claim 13, wherein the first plurality of micro-transitions introduced by the micro-transition generator each have a length of less than 25% of a period of the first data write pattern.

25. The system of claim 13, wherein the first plurality of micro-transitions introduced by the micro-transition generator each have a length of approximately 10% of a period of the first data write pattern.

26. A system for testing data storage systems, the system comprising:
means for deliberately introducing a first plurality of micro-transitions into a first data write pattern;
a write head that writes the first data write pattern, including the introduced first plurality of micro-transitions, to a magnetic media;
a read head that generates a first read-back signal; and
means for analyzing a frequency response of the first read-back signal that includes analysis of micro-transition frequency response to determine performance of the one or more components of the data storage system.

27. The system of claim 26, wherein the means for analyzing the frequency response of the first read-back signal measures amplitudes of the micro-transition frequency response and calculates performance parameters associated with a read head of the data storage system based on the measured amplitudes of the micro-transition frequency response.

28. The system of claim 26, wherein the means for analyzing the frequency response of the first read-back signal measures an amplitude of the micro-transition frequency response at a first frequency, measures an amplitude of the frequency response at a second frequency proximate to the first frequency, and calculates media noise associated with the data storage system based, in part, on a ratio of the measured amplitudes.

29. The system of claim 26, wherein the first plurality of micro-transitions have a length less than 25% of a period of the first data write pattern.

* * * * *